United States Patent [19]

Hosaka

[11] Patent Number: 4,475,182
[45] Date of Patent: Oct. 2, 1984

[54] FOCUS SERVO CONTROL SYSTEM FOR AUTOMATICALLY ADJUSTING A RELATIVE DISTANCE BETWEEN AN OBJECTIVE LENS UNIT AND A RECORDING SURFACE OF AN OPTICAL RECORDING MEDIUM

[75] Inventor: Toshihiko Hosaka, Tokorozawa, Japan

[73] Assignee: Universal Pioneer Corporation, Tokyo, Japan

[21] Appl. No.: 333,390

[22] Filed: Dec. 22, 1981

[30] Foreign Application Priority Data

Dec. 29, 1980 [JP] Japan .................................. 55-188178

[51] Int. Cl.³ .......................... G11B 7/08; G11B 7/12
[52] U.S. Cl. ........................................ 369/45; 369/46; 250/201
[58] Field of Search .................... 369/45–46, 369/100, 109–112; 250/201; 358/342

[56] References Cited

U.S. PATENT DOCUMENTS 3,974,327  8/1976  Van Dijk .............................. 369/45
3,976,828  8/1976  Janssen ................................ 369/46

FOREIGN PATENT DOCUMENTS 55-38369  3/1980  Japan .................................. 369/45
56-94528  7/1981  Japan .................................. 369/45

Primary Examiner—Raymond F. Cardillo, Jr.
Attorney, Agent, or Firm—Michael J. Striker

[57] ABSTRACT

A focus servo control system for automatically adjusting a relative distance between an objective lens unit and a recording surface of an optical recording medium in which a laser light beam is converged through an object lens on a recording surface of a recording medium and the laser light is modulated by an optical pattern on the recording surface and reflected therefrom and converted into an electrical signal wherein the focus control system includes a component adapted to be energized by an electrical current to shift the object lens perpendicularly to the recording surface, a component for detecting the laser light reflected from the recording surface for producing an error signal which represents the deviation of the focus of the lens from a desired position with respect to the recording surface, and a servo amplifier adapted to amplify the error signal thereby to produce the electric current for energizing the lens shifting components, and in order to avoid wasteful electrical power consumption and the mechanical noises, the focus control system further includes gain control components for raising the gain of the servo amplifier as the magnitude of the error signal increases.

6 Claims, 7 Drawing Figures

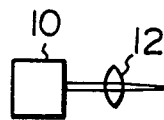
Fig. 1
PRIOR ART
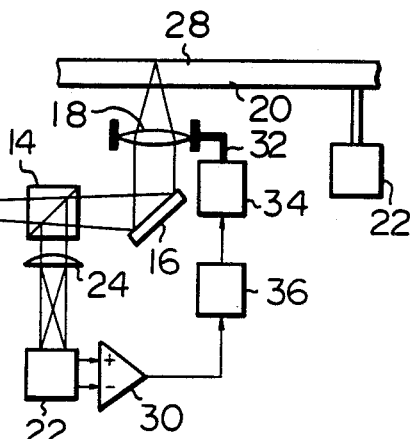
Fig. 2
PRIOR ART
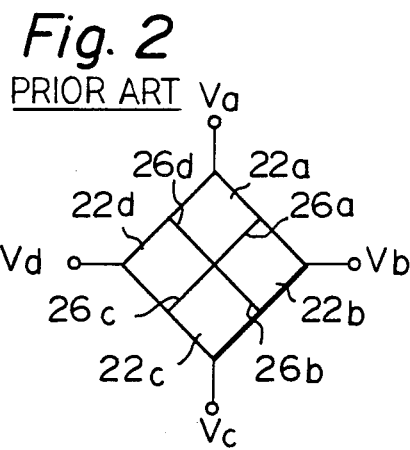
Fig. 3a
PRIOR ART
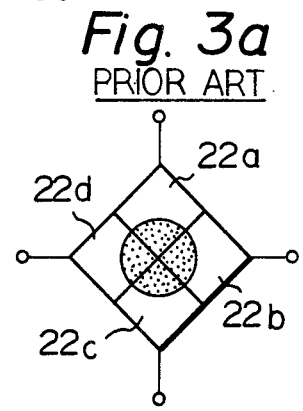
Fig. 3b
PRIOR ART
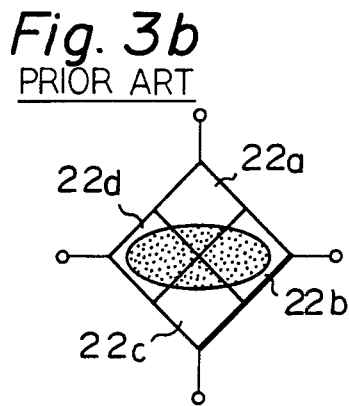
Fig. 3c
PRIOR ART
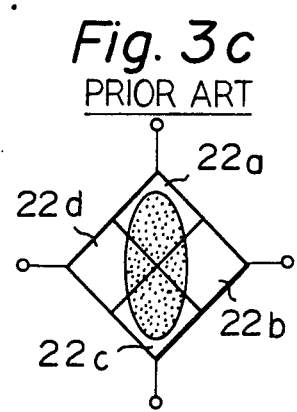

FOCUS SERVO CONTROL SYSTEM FOR AUTOMATICALLY ADJUSTING A RELATIVE DISTANCE BETWEEN AN OBJECTIVE LENS UNIT AND A RECORDING SURFACE OF AN OPTICAL RECORDING MEDIUM

FIELD OF THE INVENTION

The present invention relates to a focus servo control system for automatically adjusting a relative distance between an objective lens unit and a recording surface of an optical recording medium in which a laser light beam is converged through an object lens on a recording surface of a recording medium and the laser light modulated by an optical pattern on the recording surface and reflected therefrom and converted into an electrical signal. Such a focus servo control system is incorporated, for example, in an optical type of video or digital audio disc player.

BACKGROUND OF THE INVENTION

In such a disc player equipped with a focus servo control system of the above-mentioned type, a laser light beam is to be precisely converged through an object lens onto a recording surface of a recording disc (i.e. a recording medium) while the recording disc is rotated. The laser light reflected from the recording disc is converted into an electrical signal by means of a photoelectric converter included in the focus servo control system, the electrical signal representing the video and/or audio information stored in the recording disc. The video information is imaged on a monitor of the video disc player and the audio information is reproduced by a speaker system of the player, respectively.

Since a recording disc is subject to be warp and mounts in a slightly swerved manner on a turntable, an optical pickup system for use in a video disc player requires a focus servo device which controls the position of the object lens to precisely converge the laser light beam into a desired position with respect to the recording surface of the recording.

In a known focus servo device, the gain of a servo amplifier is fixed at a certain value. It is known that such a prior art focus servo device can not cope with relatively intense external disturbances, without the gain being fixed at a relatively large value. However, if the gain is at a large value, a correspondingly large amount of electrical power is consumed and also mechanical noises are developed due to a so-called piston motion of a system carrying the above-mentioned object lens in the focus servo device.

SUMMARY OF THE INVENTION

It is therefore an object of the present invention to provide an improved focus servo device, in which the above drawbacks can be avoided.

In order to accomplish the above object, the present invention contemplates a focus servo control system in which a light beam is converged through an object lens on a recording surface of a recording medium and the light beam is modulated by an optical pattern on the recording surface and reflected therefrom and converted into an electrical signal. The system comprises means adapted to be energized by an electric current for shifting the object lens in a predetermined direction, means for detecting the light beam reflected from the recording surface for producing an error signal which represents the amount and direction of the deviation of the focus of the object lens from a desired position with respect to the recording surface, a servo amplifier adapted to amplify the error signal thereby to produce the electric current, and gain control means for raising the gain of the servo amplifier as the magnitude of the error signal increases.

The drawbacks inherent in the prior art focus servo device and the features and advantages of a focus servo device according to the present invention will be more clearly understood from the following description taken in conjunction with the accompanying drawings in which like reference numerals designate similar or corresponding components.

BRIEF DESCRIPTION OF THE DRAWINGS

FIG. 1 is a schematic diagram showing an optical pickup system incorporated with a prior art focus servo device;

FIG. 2 is a plan view of a photoelectric converter assembly shown in FIG. 1;

FIGS. 3a to 3c are respectively plan views of the photoelectric converter assembly of FIG. 2, in which various shapes of a laser light spot are shown dotted;

DESCRIPTION OF THE PRIOR ART

Figure 4:
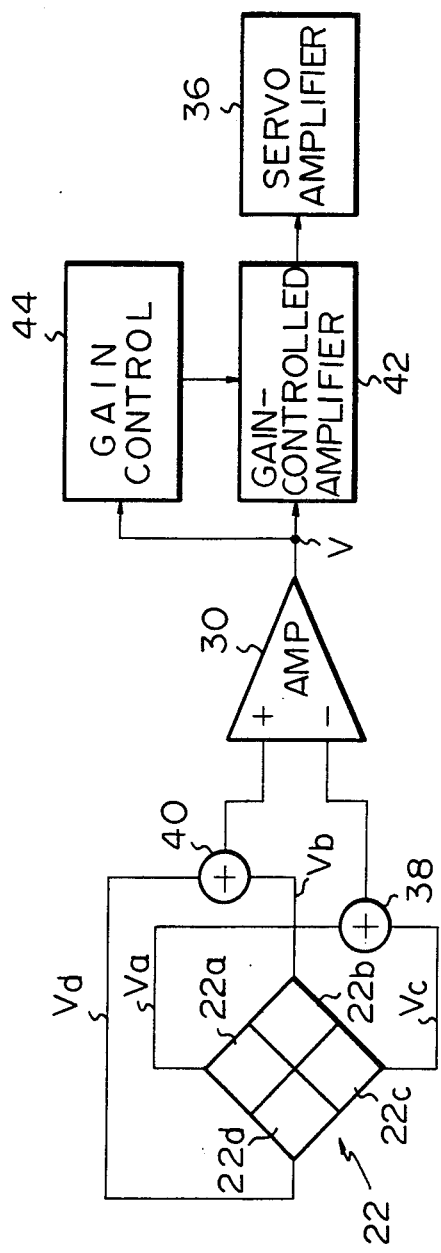
FIG. 4 is a block diagram showing an embodiment of the focus servo device according to the present invention.

A known focus servo device is schematically shown in FIG. 1. The device of FIG. 1 has a laser light source 10. The laser light beam emitted from the laser light source 10 enters a diverging lens 12. The laser light beam passed through the lens 12 converges onto a point and then diverges therefrom. The laser light then passes through a beam splitter 14. The laser light beam is then deflected by a mirror 16 toward an object lens 18. The object lens 18 coverges the laser light from the mirror 16 into a position slightly spaced from a recording surface 28 which is carried in a transparent recording disc 20 and which is rotated at a high velocity by a motor 22. The laser light is reflected by the recording surface 28 and reversely passes through the object lens 18 toward the mirror 16. The laser light is then reflected by the mirror 16 toward the beam splitter 14. The beam splitter 14 deflects the laser light from the mirror 16 toward a photoelectric converter assembly 22 which comprises an array of four (4) separate photoelectric converter elements 22a to 22d disposed side by side, as shown in FIG. 2, and each element being constituted by e.g. a photodiode. Between the beam splitter 14 and the photoelectric converter assembly 22, there is provided a cylindrical lens 24 the generatrix of which is perpendicular to the optical axis of the laser light coming from the beam splitter 14. The photoelectric converter assembly 22 is arranged in such a manner that the surfaces of the photoelectric converter elements 22a to 22d, which are to receive the laser light from the beam splitter 14, lie in a plane parallel with the plane side surface of the cylindrical lens 24 while division lines 26a to 26d, between the four elements 22a to 22d, are inclined by 45° or 135° with respect to the generatrix of the cylindrical lens 24.

In this arrangement, the laser light beam from the beam splitter 14 has a generally round cross section and is refracted by the cylindrical lens 24 to form a round or ellipsoidal light spot on the photoelectric converter assembly 22, as shown in FIGS. 3a, 3b and 3c. When the focus of the object lens 18 is at a desired position, which is spaced by a predetermined distance from the recording surface 28 of the recording disc 20, the light spot on the photoelectric converter assembly 22 has a round shape, as shown in FIG. 3a, so that the outputs of the four photoelectric converter elements 22a to 22d are at the same level. On the other hand, when the focus of the object lens 18 deviates from the desired position to approach the recording surface 28, the light spot on the photoelectric converter assembly 22 becomes ellipsoidal in shape, with the major axis of the ellipsoid passing through diagonally opposing two (e.g. 22a and 22c) of the four photoelectric converter elements. While receiving larger amounts of light, the two photoelectric converter elements 22a and 22c produce respectively larger outputs than the remaining two photoelectric converter elements 22b and 22d. Whereas, when the focus of the object lens 18 deviates from the desired position to recede from the recording siurface 28, the laser light spot becomes likewise ellipsoidal, however the major axis of the ellipsoid, in this case, passes through the other diagonally opposing two of the four photoelectric converter elements 22b and 22d as shown in FIG. 3b, so that these two elements 22b and 22d produce respectively larger outputs than the two elements 22a and 22c.

To detect the positional relationship between the object lens 18 and the recording surface 28 of the recording disc, on the basis of the outputs of the four elements 22a and 22d, the outputs of the diagonally opposing two elements 22a and 22c are added to each other and supplied to an input of a differential amplifier 30 while the outputs of the remaining two elements 22b and 22d are likewise added to each other and supplied to another input of the differential amplifier 30. The differential amplifier 30 thus produces an output or error signal which represents the amount and direction of the deviation of the object lens 18 from its desired position relative to the recording surface 28. Such means for obtaining the error signal is described in detail, for example, in Japanese Provisional Patent Publication No. 54-142203 (Application Serial No. 52-57429).

The object lens 18 is carried by a lens carrier 32 which is connected to an electric actuator device 34. The error signal from the differential amplifier 30 is amplified by a servo amplifier 36 which delivers an electric current to the actuator device 34. The actuator device 34 is energized by the current from the servo amplifier 36 to actuate the lens carrier 32 in a predetermined direction perpendicular to the recording surface 28, whereby the object lens 18 is positioned relative to the recording surface 28.

In this known arrangement, the gain of the servo system is fixed at a certain value. As previously described, briefly, if the value is large, mechanical noises will arise due to the so-called speaker effect which is created by the piston motion of the lens carrier 32. Moreover, a relatively large amount of electrical power is consumed in the servo system, if the gain is large. In addition, when the laser light spot on the recording surface 28 is shifted relative to the recording disc, in the radial direction thereof, to search a desired video information stored in the recording disc 20, then the energy distribution of the laser light spot on the photoelectric converter assembly 22 becomes asymmetric with respect to the division lines 26a to 26d so that the servo system becomes extremely prone to undergo the influence of defocus. On the other hand, with a small value of the gain of the servo system, there appears to be a drawback that the servo system can not cope with rapid fluctuations in the relative position of the recording surface to the object lens.

DESCRIPTION OF THE PREFERRED EMBODIMENTS

In order to avoid the above drawbacks, a focus servo device of the present invention includes gain control means for raising the gain of the servo amplifier as the magnitude of the error signal increases. This will be described below.

Referring now to FIG. 4, there is shown a block diagram of part of an embodiment of the focus servo device according to the present invention. The device of FIG. 4 comprises a photoelectric converter assembly 22 which is substantially the same as that of the device of FIG. 1.

In the following description, it is assumed that the embodiment shown in FIG. 4 is incorporated in an optical pickup system similar to the system shown in FIG. 1 and that the spot of laser light on the photoelectric converter assembly 22 varies its shape in the same manner as described above and shown in FIGS. 3a to 3c.

Outputs $V_a$ and $V_c$ of a pair of diagonally opposing two elements 22a and 22c, respectively, are added to each other by an adder 38 whose output is supplied to an input of a differential amplifier 30, while outputs $V_b$ and $V_d$ of another pair of diagonally opposing two elements 22b and 22d, respectively, are added to each other by another adder 40 whose output is supplied to another input of the differential amplifier 30.

The output of the differential amplifier 30 or an error signal V, which represents the amount and direction of the deviation of an object lens 18, is supplied to an input of a gain-controlled amplifier 42 and amplified thereby. A gain control circuit 44 is provided which is adapted to detect the error signal and to raise the gain of the amplifier 42 in a predetermined manner as the magnitude of the error signal increases. The output of the gain-controlled amplifier 42 is supplied to the input of a servo amplifier 36, the output current of which is supplied to an actuator device 34. Energized by the current from the servo amplifier 36, the actuator 34 actuates a lens carrier 32 to shift the object lens 18 perpendicularly to the recording surface 28, thereby compensating for the deviation of the lens 18, and whereby the object lens 18 is positioned while a recording medium or recording disc 20 is rotated.

In an optical pickup system incorporated with the embodiment of FIG. 4, the gain of the gain-controlled amplifier 42 is thus maintained small when the magnitude of the error signal is relatively small, so that not only the occurrence of the previously described mechanical noises but also wasteful power consumption can be suppressed. On the other hand, when the error signal magnitude increases due to severe fluctuations in the position of the recording surface relative to the object lens, or due to external disturbances, then the gain control circuit 44 operates to raise the gain of the amplifier 42 so that the servo loop can deal with an intensive error signal.

Figure 5:
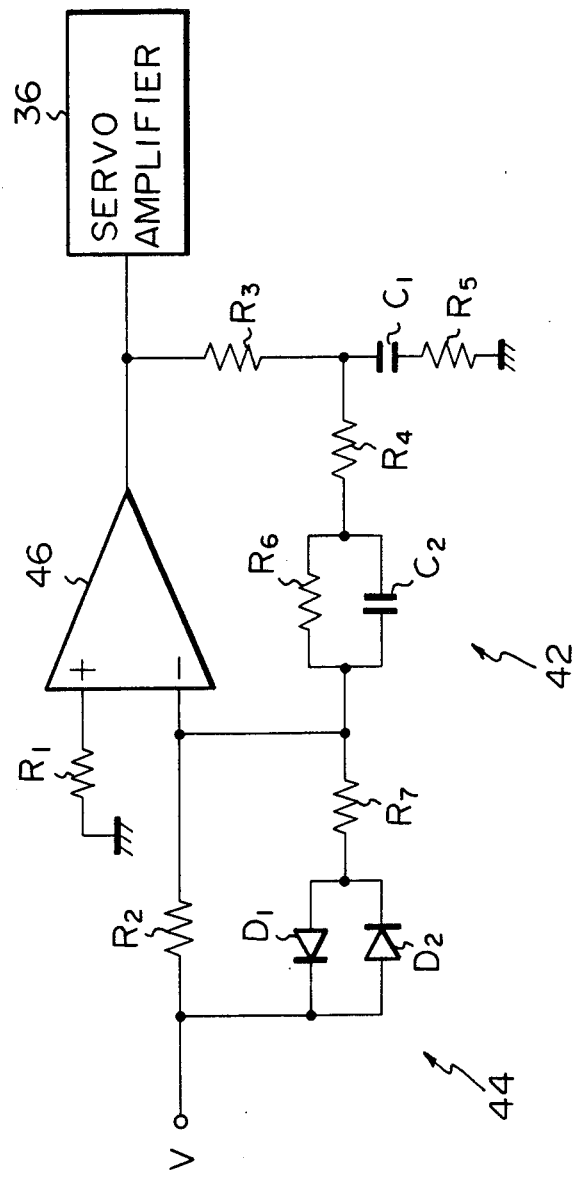
FIG. 5 is a circuit diagram showing part of the device according to the present invention.

FIG. 5 shows an example of a circuit arrangement of the gain control circuit 44 and the gain-controlled amplifier 42. In this example, the amplifier 42 comprises an operational amplifier 46. The non-inverting input of the operational amplifier 46 is connected through a resistor $R_1$ to ground while the inverting input thereof is connected through another resistor $R_2$ to the output of the differential amplifier 30. The output of the operational amplifier 46 is connected to the input of the servo amplifier 36 and is further connected to one end of a resistor $R_3$. The other end of the resistor $R_3$ is connected to one end of another resistor $R_4$, and further connected to ground through a series circuit comprising a capacitor $C_1$ and a resistor $R_5$. The other end of the resistor $R_4$ is connected to the inverting input of the operational amplifier 46 through a capacitor $C_2$ and a resistor $R_6$, connected in parallel with each other. These components $R_3$, $R_4$, $R_5$, $R_6$, $C_1$ and $C_2$ constitute a negative feedback circuit between the inverting input of the operational amplifier 46 and the output thereof. The operational amplifier 46, in combination with this negative feedback circuit, constitute an equalizer which shifts the phase of the error signal while amplifying the error signal with a suitable frequency characteristic to prevent self-exciting oscillation of the servo system. The gain of the equalizer is controlled by an impedance variable circuit 44 provided between the differential amplifier output V and the inverting input of the operational amplifier 46. The impedance variable circuit 44 comprises, in this example, the resistor $R_2$, and a nonlinear circuit connected in parallel with the resistor $R_2$ and having a nonlinear voltage-current characteristic.

The nonlinear circuit comprises, in this example, a pair of diodes $D_1$ and $D_2$ connected in parallel and reversely with each other, and a series resistor $R_7$. The nonlinear circuit is substantially nonconductive when the voltage applied thereacross is within a small range (for example, $-0.7$ to $+0.7$ Volts) limited by the thesholds of the diodes $D_1$ and $D_2$. Whereas, when the applied voltage is raised or lowered out of the predetermined range, the resistance of the nonlinear circuit lowers steeply. Thus, when the error signal or the differential amplifier output varies within a predetermined small range of intensity, the nonlinear circuit $R_7$, $D_1$ and $D_2$ is maintained substantially nonconductive so that the gain of the equalizer including the operational amplifier 46 remains substantially at the ratio of the impedance of the negative feedback circuit to the impedance of the resistor $R_2$. Whereas, when the error signal becomes more intensive and becomes out of the predetermined small range, the resistance of the nonlinear circuit steeply lowers so that the impedance between the differential amplifier output and the operational amplifier inverting input is lowered with the result being that the gain of the equalizer including the operational amplifier 46 is correspondingly raised.

Though the negative feedback circuit of the operational amplifier 46 of the embodiment shown in FIG. 5 serves as part of an equalizer for preventing self-exciting oscillation of the servo system, the negative feedback circuit may consist of a single registor. In such a case, the servo amplifier 36 includes an equalizer circuit for preventing the self-exciting oscillation of the servo system.

While the embodiment has been described on the assumption that the laser light source is disposed in the optical pickup system independently of the object lens, it will be understood that the invention is as well applicable to a so-called laser diode pickup in which the laser light source consists of a laser diode carried together with the object lens on a single structure adapted to be shifted in a predetermined direction.

It will be understood that the invention is not to be limited to the exact construction shown and described and that various changes and modifications may be made without departing from the spirit and scope of the invention, as difined in the appended claims.

What is claimed is:

1. A focus servo control system for automatically adjusting a relative distance between an objective lens unit and a recording surface of an optical recording medium, comprising:

a light source for projecting a light beam on the recording surface of the recording medium along an optical path passing through the objective lens unit;

a photo-electric transducer disposed at a position for receiving a reflection of said light beam, being reflected by the optical recording medium and travelling along said optical path through the objective lens unit;

focus error signal generating means responsive to an output signal of said photo-electric transducer, for generating a focus error signal whose magnitude is substantially proportional to a deviation of the relative distance from a specific relative distance at which said light beam is focalized, and whose sign represents the direction of said deviation;

variable gain amplifying means responsive to said focus error signal, for generating an output signal, said variable gain amplifying means being operative to raise its gain when the magnitude of said focus error signal is greater than a predetermined value; and drive means connected to the objective lens unit and responsive to said output signal of said variable gain amplifying means, for determining a position of the objective lens unit along said optical path, in accordance with a magnitude and a sign of said output signal of said variable gain amplifying means.

2. A focus servo control system as set forth in claim 1, wherein said variable gain amplifying means consists of an amplifier having an input terminal for receiving said focus error signal and an output terminal for providing said output signal and a variable impedance circuit connected to said input terminal, through which said focus error signal is applied to said amplifier, impedance value of said variable impedance circuit decreases when the magnitude of said focus error signal is greater than the predetermined value.

3. A focus servo control system as set forth in claim 2, wherein said variable impedance circuit includes a pair of diodes inversely connected to one another, said diodes having a non-linear resistance characteristic with respect to potential difference berween an anode and a cathode thereof.

4. A focus error control system as set forth in claim 2, wherein said amplifier is further associated with a phase compensating circuit connected between said input terminal and said output terminal.

5. A focus servo control system for automatically adjusting a relative distance between an objective lens unit and a recording surface of an optical recording medium, comprising:

a light source for projecting a light beam on the recording surface of the recording medium along an optical path passing through the objective lens unit;

a photo-electric transducer disposed at a position for receiving a reflection of said light beam, being reflected by the optical recording medium and travelling along said optical path through the objective lens unit;

focus error signal generating means responsive to an output signal of said photo-electric transducer, for generating a focus error signal whose magnitude is substantially proportional to a deviation of the relative distance from a specific relative distance at which said light beam is focalized, and whose sign represents the direction of said deviation;

variable gain amplifying means responsive to said focus error signal, for generating an output signal, said variable gain amplifying means consisting of an amplifier having an input terminal for receiving said focus error signal and an output terminal for providing said output signal, and a variable impedance circuit connected to said input terminal, through which said focus error signal is applied to said amplifier, impedance value of said variable impedance circuit decreases when the magnitude of said focus error signal is greater than a predetermined value, whereby to raise a gain of said variable gain amplifying means; and drive means connected to the objective lens unit and responsive to said output signal of said variable gain amplifying means, for determining a position of the objective lens unit along said optical path, in accordance with a magnitude and a sign of said output signal of said variable gain amplifying means.

6. A focus servo control system as set forth in claim 5, wherein said variable impedance circuit includes a pair of diodes inversely connected to one another, said diodes having a non-linear resistance characteristic with respect to potential difference between an anode and a cathode thereof.

* * * * *